United States Patent
Schoonover et al.

(10) Patent No.: US 6,203,734 B1
(45) Date of Patent: Mar. 20, 2001

(54) LOW PRESSURE INJECTION MOLDING OF METAL AND CERAMIC POWDERS USING SOFT TOOLING

(75) Inventors: James Schoonover, Flemington; Mohammad Behi, Lake Hiawatha; Michael Sean Zedalis, Mendham, all of NJ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 09/197,623

(22) Filed: Nov. 23, 1998

(51) Int. Cl.7 .................. C04B 35/622; C04B 35/636
(52) U.S. Cl. ............ 264/122; 264/109; 264/220; 264/225
(58) Field of Search .................. 264/220, 225, 264/122, 109; 249/66.1

(56) References Cited

U.S. PATENT DOCUMENTS

| | | | |
|---|---|---|---|
| 3,811,175 | * 5/1974 | Garner et al. | 29/464 |
| 4,734,237 | 3/1988 | Fanelli et al. | 264/122 |
| 4,940,561 | * 7/1990 | Fritz | 264/225 |
| 5,260,014 | * 11/1993 | Holton et al. | 264/134 |
| 5,358,211 | * 10/1994 | Sterett | 249/80 |
| 6,066,274 | * 5/2000 | Antonson et al. | 264/16 |

FOREIGN PATENT DOCUMENTS

| | | |
|---|---|---|
| 0-412-891 | 2/1991 | (EP) . |
| 58-084718 | 5/1983 | (JP) . |
| 63-202411 | 8/1988 | (JP) . |
| 4-284207 | 3/1991 | (JP) . |
| 7-186151 | 7/1995 | (JP) . |
| 7-232332 | 9/1995 | (JP) . |

OTHER PUBLICATIONS

R.M. German and A. Bose, "Injection Molding of Metals and Ceramics", Metal Powder Industries Federation, p53, p. 144, Princeton, New Jersey 1997.

* cited by examiner

Primary Examiner—Allan R. Kuhns
(74) Attorney, Agent, or Firm—Roger H. Criss

(57) ABSTRACT

A method for rapidly manufacturing soft tooling from organic polymer-based resins and reinforcement filler materials for use in an injection molding machine to make complex metal and ceramic parts from powders. The cost to produce the tooling is relatively low and the manufacturing time is relatively short compared to conventional processes for making metal tooling. The finished parts are near-net shape, requiring little or no machining, and have excellent sintered properties.

12 Claims, 5 Drawing Sheets

LOW PRESSURE INJECTION MOLDING OF METAL AND CERAMIC POWDERS USING SOFT TOOLING

FIELD OF THE INVENTION

This invention relates to a process for the rapid manufacture of soft tooling for the production of complex metal and ceramic parts from powders using injection molding techniques. The finished parts are near-net shape, requiring little or no machining, and have excellent sintered properties. More particularly, the invention is directed to a molding process utilizing soft materials such as organic polymer-based resins to produce the tooling for use in an injection molding machine.

BACKGROUND OF THE INVENTION

The production of sintered parts from "green bodies" is well known in the prior art. Generally, the green body is formed by filling a die with a powder/binder mixture and compacting the mixture under pressure. The green body, which is a self-supporting structure, is then removed from the die and sintered. During the sintering process, the binder is volatilized and burned out. The sintered part is typically not fully dense (approximately 85–90% of theoretical density) and has substantially reduced mechanical properties compared to wrought material.

Injection molding is a preferred process for manufacturing complex, near-net shape parts from metal and ceramic powders. The tools for producing injection molded parts are generally made from metals, such as aluminum and tool steels in particular, due to the high pressures and temperatures normally required for state-of-the-art metal and ceramic feedstocks. Construction of hard tooling frequently involves long manufacturing turnaround times and is very costly. Furthermore, determination of accurate shrinkage factors for the tool material typically requires multiple iterations of successive, expensive machining.

Most state-of-the-art molding formulations use organic waxes and/or polymers as the molding, fluidizing medium. Polymer-based molding formulations require high molding pressures up to about 15,000 psi and molding temperatures above 212° F. (R. M. German and A. Bose, "*Injection Molding of Metals and Ceramics*," Metal Powder Industries Federation, p53, p144, Princeton, N.J. 1997). The high pressures and temperatures employed by these systems necessitate the use of metal tooling, such as aluminum and steel, and preclude the use of "soft" tooling, such as organic polymer-based materials. The use of such soft tooling, utilizing plastic resins which are usually fortified with a particulate filler, obviates much of the high cost of manufacture and long turnaround times associated with hard tools. Furthermore, soft tooling can be more easily modified than can hard tooling, thus facilitating more accurate determination of shrinkage factors for net shape fabrication of metal and ceramic parts.

The advantages of soft tools for net shape fabrication can be realized using injection molding feedstock materials which permit the use of low molding pressures below about 1500 psi and low temperatures below about 212° F.

Typical examples of these feedstock materials are aqueous, polysaccharide-based injection molding compounds.

BRIEF SUMMARY OF THE INVENTION

The present invention overcomes these shortcomings by providing a method of fabricating complex, net and near-net shape parts using relatively inexpensive soft tooling and fast turnaround times. According to the invention, a method for the rapid manufacture of a soft tool includes the steps of providing a pattern of a desired shape, pouring material around the pattern to form a soft tool, curing the soft tool material to a rigid solid, and removing the pattern from the soft tool material to form a cavity therein. The soft tool produced by this process is considered a near-net shape tool requiring little or no final machining. Such near-net shape tools are used to manufacture metal, ceramic or plastic parts by traditional manufacturing techniques including injection molding, press-forging, blanking or drawing. Among the advantages of using soft tools to manufacture near-net shape parts in an injection molding machine is the use of feedstock materials which can be molded at pressures below about 1500 psi and temperatures below about 212° F.

The invention further includes a method for manufacturing near-net shape parts using the soft tooling manufactured in accordance with the present invention. The method includes the steps of providing a pattern of a desired shape, pouring material around the pattern to form a soft tool, curing the soft tool material to a rigid solid, removing the pattern from the soft tool material to form a cavity therein, mounting an ejector system on the soft tool, mounting the soft tool on an injection molding machine, and introducing a powder feedstock material into the injection molding machine at appropriate temperatures and pressures and for the appropriate amounts of time to mold the desired part.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

Figure 1:
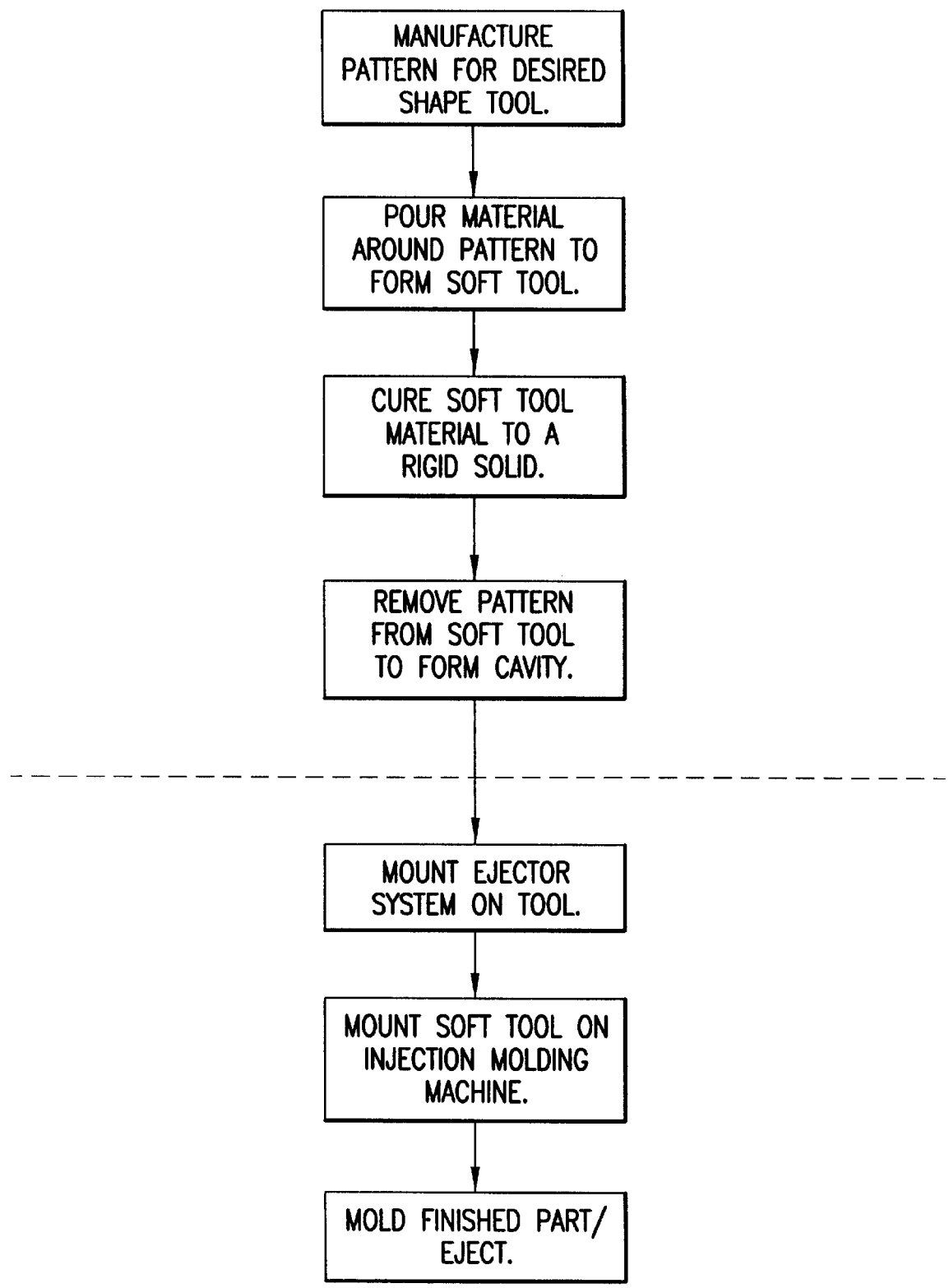
FIG. 1 is a schematic flow diagram of one embodiment of a method for the manufacture of soft tooling according to the present invention, and further includes a method for manufacturing near-net shape finished parts from the tooling.

Soft tooling of any shape, including complex shapes, are formed according to this invention from a combination of plastic resins and a filler in the form of particulates, which provide strength, deformation resistance and facilitation of heat transfer. The most preferred plastic resins are drawn from the classes of materials including urethanes and epoxy resins. A wide variety of materials including metals, metal oxides, metal carbides and metal silicates, among others, can be used as reinforcement filler. Useful metals include aluminum, iron, steel, copper, nickel, zinc and tin. Useful non-metal compounds include metal oxides, nitrides, silicates, carbonates and phosphates, such as aluminum oxide, silica, magnesium oxide, calcium oxide, calcium and magnesium carbonates, dolomite, aluminosilicates, cordierite, calcium sulfate, clays, talc, graphite and carbon, among others. The reinforcement materials may be used alone, in mixtures and in alloys. Particulate shapes including powder, shot and filings may be used advantageously. The amount of filler is generally between about 25–45 volume %. The most useful soft tooling compositions according to the present invention have been found to include aluminum filings of about 30 volume % in combination with epoxy or urethane plastic material.

The soft tooling produced in this manner is then used in an injection molding machine to make metal, ceramic and combination metal/ceramic near-net shape parts from powder materials. The present invention is believed to provide the first comercially viable process for economically manufacturing hard metal and ceramic parts of complex shapes from soft tooling made from a plastic resin/filler combination.

The present invention contemplates casting a soft tool around a master, which may be made by any number of suitable methods well known to those skilled in the art, such as by machining or grown SLA masters. The latter process consists of converting a three-dimensional solid CAD file into a scaled-up SLA master, which is then used as the pattern for casting the soft tool. Resin, most preferably polyurethane or epoxy, is pre-mixed with the reinforcement filler and cast around the master. After the resin cures to a solid, the master is removed leaving a cavity in the tool in the desired shape of the ultimate metal or ceramic article to be manufactured. If necessary, secondary operations can be performed on the soft tool to create a finished, multiple-use tool for the production of finished parts from powder feedstock material as described in Fanelli et al, U.S. Pat. No. 4,734,237, and as further described in U.S. patent application Ser. No. 5,985,208, the disclosures of both of which are incorporated herein by reference. It should be understood that the soft tool could be further modified to incorporate other standard desirable features such as cooling lines, guide pins, removable sprue and ejector systems to facilitate the manufacture of the final parts on a standard injection molding machine.

The soft tool is suitable for installation on any of a number of standard injection molding machines commonly used for injection molding of plastic materials and hard materials, including metals and ceramics. Injection molding is carried out using low pressure/low temperature feedstock materials capable of being molded at pressures below about 1500 psi and temperatures below about 212° F. Aqueous, polysaccharide-based feedstock materials, as described in Fanelli et al, are the preferred types of compositions for injection molding utilizing the soft tooling in accordance with the present invention.

After the parts are removed from the injection molding machine, they are dried and fired according to sintering schedules consistent with the material being molded. Sintering schedules are well known in the art for a multitude of metal and ceramic materials and need not be described herein.

FIG. 1 schematically illustrates a flow diagram of a preferred embodiment of the process for manufacturing the soft tooling and producing finished parts in an injection molding machine, including the following steps:

a) making a pattern of a desired shape;

b) pouring material around the pattern to form a soft tool;

c) curing the soft tool material to a rigid solid; and d) removing the pattern from the soft tool material to form a cavity therein.

It should be understood that the pattern could be made from an epoxy or metal, such as aluminum or steel, and should reflect appropriate shrinkage data for the material being used. Some finishing machining might be necessary to obtain the exact dimensions required for the soft tool. Once the soft tool meets all required properties, final parts are manufactured in an injection molding machine utilizing the following steps shown in FIG. 1:

e) mounting an ejector system on the soft tool;

f) mounting the soft tool on an injection molding machine; and g) introducing a powder feedstock material into the injection molding machine at appropriate temperatures and pressures and for the appropriate amounts of time to mold the desired part.

Having described the invention in full, clear and concise terminology, the following examples are provided to illustrate some preferred embodiments of the invention. The examples, however, are not intended to limit the scope of the invention to anything less than is set forth in the appended claims.

EXAMPLE 1

An SLA master/pattern, grown using a laser system, was made from a CAD file in the shape of a teacup. Epoxy resin was pre-mixed with aluminum filings constituting approximately 30 volume % of the casting medium and was poured around the master/pattern, which was supported in a wooden form. The epoxy resin was allowed to cure undisturbed for approximately 24 hours, setting to a rigid solid. The master was then removed leaving a cavity in the epoxy mold in the shape of the teacup, and the epoxy mold was removed from the wood support. Secondary machining operations were performed on the epoxy mold consisting of the introduction of a sprue bushing, nozzle passage, ejector system, venting, gating, support brackets, and locating ring in order to allow installation in an injection molding machine. The total elapsed time from completion of the CAD drawing to molding of the epoxy tool was approximately three weeks. The tool was installed on a Cincinnati Milicron 85 ton reciprocating screw injection molding machine, and the net shape teacups were molded from aqueous 316 L stainless steel feedstock material using hydraulic molding pressures of approximately 400–700 psi and a barrel temperature of approximately 185° F. The mold temperature was controlled at 55° F. by means of a chiller. The finished cups shown in FIG. 3(a) were dried for approximately 24 hours and then sintered in an air atmosphere using standard sintering schedules for 316L stainless steel. The cups possessed all of the required strength, dimensional and appearance characteristics.

EXAMPLE 2

Figure 3A:
FIG. 3a is a photograph of stainless steel and ceramic teacups made in an injection molding machine using soft tooling and aqueous polysaccharide feedstock material.

The procedures described in Example 1 were followed for this example except that an aqueous ceramic feedstock material was used to mold the teacup in the injection molding machine. The ceramic feedstock material consisted of aluminosilicate powder compounded with water and agar polysaccharide binder as the principal components. The molded cups were dried and sintered in an air atmosphere using standard ceramic sintering schedules. The pressures, temperatures and times were essentially the same for the ceramic feedstock material in the present example as for the 316L stainless steel feedstock material in Example 1. The finished cups are shown in FIG. 3(a).

EXAMPLE 3

Figure 3B:
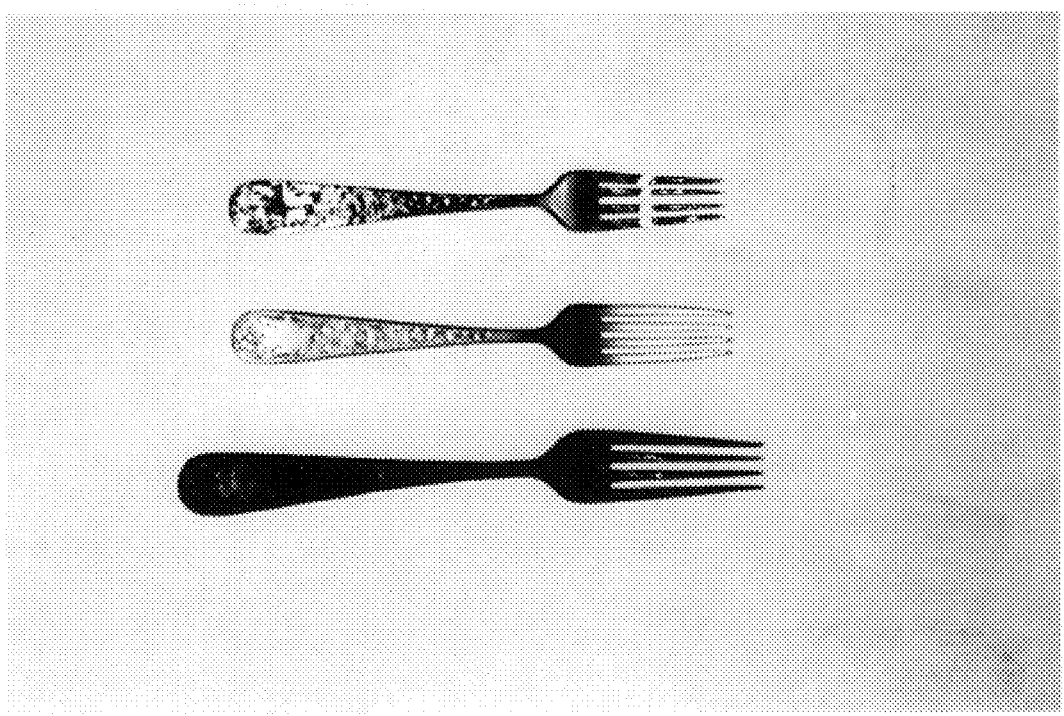
FIG. 3b is a photograph of stainless steel flatware made in an injection molding machine using soft tooling and aqueous polysaccharide feedstock material.
Figure 3C:
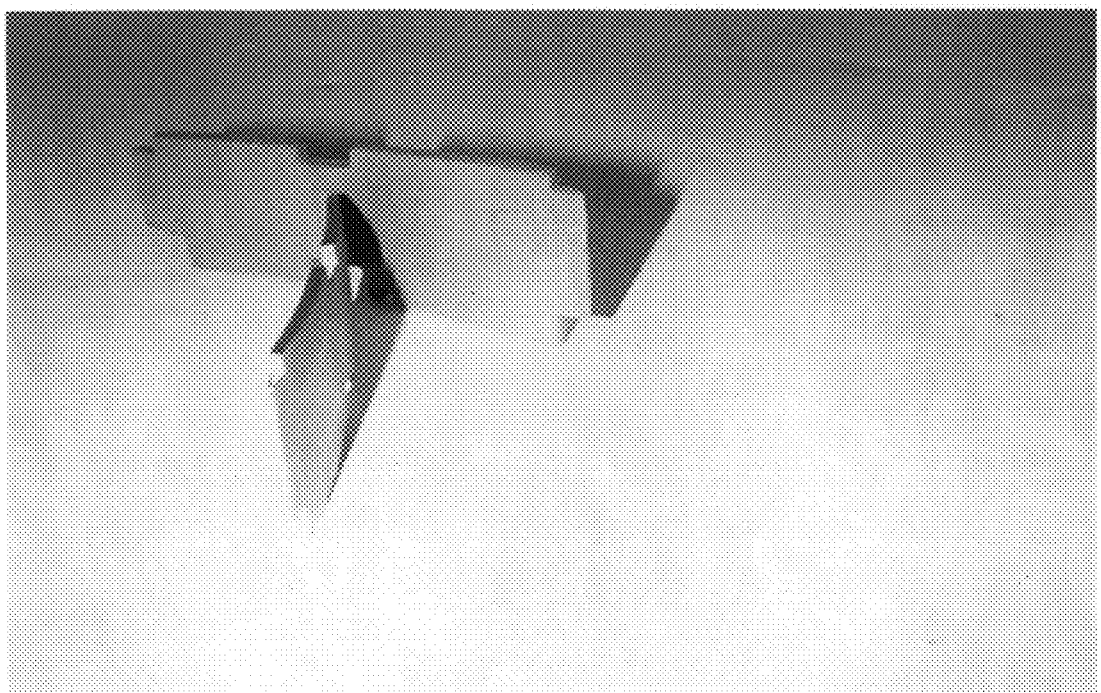
FIG. 3c is a photograph of a stainless steel inlet guide vane made in an injection molding machine using soft tooling and aqueous polysaccharide feedstock material.

An "inlet guide vane" was made from a machined steel master/pattern. The approximate dimensions of the vane were 4"×¾"×1/16". Epoxy resin premixed with aluminum filings constituting approximately 30 volume % of the casting medium was poured around the master/pattern, which was supported in a wooden form. After the epoxy resin cured for approximately 24 hours to a rigid solid, the master was removed leaving a cavity in the epoxy mold in the shape of the inlet guide vane and the epoxy mold was removed from the supporting wooden form. Secondary machining operations were performed as necessary on the epoxy tool, as described in Example 1. The epoxy tool was installed on the Cincinnati Milicron injection molding machine, and the net shape vanes were molded from aqueous 17-4PH stainless steel feedstock material using hydraulic molding pressures in the range of approximately 400–700 psi, and a barrel temperature of approximately 185° F. The mold temperature was controlled at approximately 55° F. by means of a chiller. The finished vanes shown in FIG. 3(c) were dried for approximately 24 hours and then sintered in a hydrogen atmosphere using standard sintering schedules for 17-4PH stainless steel. The vanes possessed all of the required properties and characteristics.

EXAMPLE 4

Figure 2:
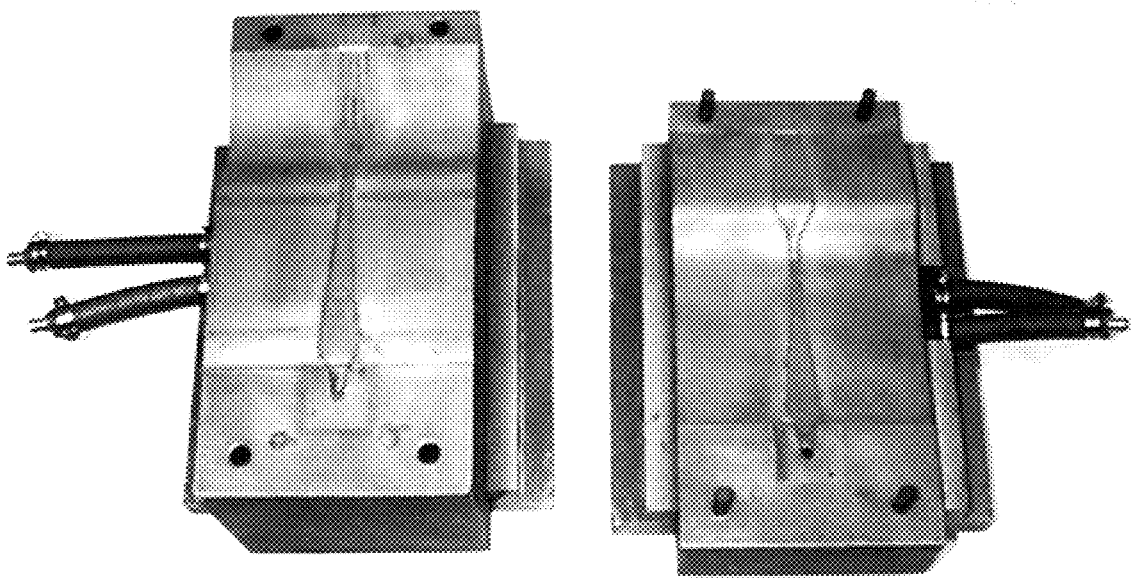
FIG. 2 is a photograph of a soft tool mold made from epoxy resin filled with about 30 volume % of aluminum filings.

Flat tableware in the form of a fork was made from a machined steel master following the general procedure of Example 1. Polyurethane was premixed with aluminum filings constituting approximately 30 volume % of the casting medium and was cast around the master/pattern, which was supported in a wooden form. The urethane was allowed to cure undisturbed for approximately 24 hours, setting to a rigid solid. The master was then removed leaving a cavity in the urethane mold in the shape of the fork as shown in FIG. 2, and the mold was removed from the supporting wooden form. Secondary machining operations were performed as necessary on the urethane tool, as described in Example 1. The tool shown in FIG. 2 was installed on a Cincinnati Milicron 55 ton reciprocating screw injection molding machine, and the net shape forks were molded from 316L and 17-4PH stainless steel feedstock material using hydraulic molding pressures in the range of approximately 400–700 psi and a barrel temperature of approximately 185° F. The mold temperature was controlled at approximately 55° F. by means of circulating fluid from a chiller. The finished flatware shown in FIG. 3(b) was dried for approximately 24 hours and then sintered in a hydrogen atmosphere using standard sintering schedules for 316L or 17-4PH stainless steels. The flatware possessed the required properties relating to surface finish and density.

The present invention satisfies a longstanding industry need to manufacture net shape complex parts out of metal or ceramic materials using "soft tooling," such as epoxy resins or polyurethanes, in injection molding equipment. The tooling cost is relatively low and the manufacturing time is relatively short compared to conventional processes for making metal tooling. The finished parts require little or no additional processing, resulting in a very economical manufacturing process.

Having thus described the invention in rather full detail, it will be understood that such detail need not be strictly adhered to but that various changes and modifications may suggest themselves to one skilled in the art, all falling within the scope of the invention as defined by the following claims.

What is claimed is:

1. A method for manufacturing a desired part comprising the steps of:
   a) providing a pattern of a desired shape;
   b) pouring a material around the pattern to form a soft tool;
   c) curing the soft tool material to a rigid solid;
   d) removing the pattern from the soft tool material to form a cavity therein;
   e) mounting an ejector system on the soft tool;
   f) mounting the soft tool on an injection molding machine; and
   g) introducing an aqueous metal and/or ceramic powder feedstock material into the injection molding machine at a molding temperature less than about 212° F. and a hydraulic molding pressure less than about 1500 psi for the appropriate amounts of time to mold the desired part.

2. The method of claim 1, wherein the soft tool material comprises an organic polymer-based resin and a reinforcement filler material.

3. The method of claim 2, wherein the organic polymer-based resin is selected from the group consisting of epoxy and urethane polymers.

4. The method of claim 2, wherein the reinforcement filler material is selected from the group consisting of metals, metal oxides, metal carbides, metal silicates, metal carbonates, metal phosphates, aluminosilicates, clays, talc, graphite and carbon.

5. The method of claim 4, wherein the metal reinforcement material is selected from the group consisting of aluminum, iron, steel, copper, nickel, zinc and tin.

6. The method of claim 2, wherein the reinforcement filler material comprises a single material, a mixture or an alloy.

7. The method of claim 2, wherein the reinforcement filler material is selected from the group consisting of filings, powder and shot.

8. The method of claim 2, wherein the reinforcement filler material comprises aluminum filings constituting between approximately 20 to 45 volume percent of the total soft tool material.

9. The method of claim 8, wherein the aluminum filings constitute approximately 30 volume percent of the total soft tool material.

10. The method of claim 1, wherein the curing time for the soft tool material is within the range of about 4 to about 24 hours.

11. The method of claim 1, wherein the powder feedstock material includes powder selected from the group consisting of metals, ceramics and combinations thereof, compounded with water, polysaccharide binder and optionally other processing-aid additives.

12. The method of claim 1, wherein the hydraulic molding pressure is between about 400 to 700 psi and the molding temperature is about 185° F.

* * * * *